No. 851,845. PATENTED APR. 30, 1907.
A. VANDERBEEK.
UNIVERSAL JOINT.
APPLICATION FILED AUG. 11, 1905.
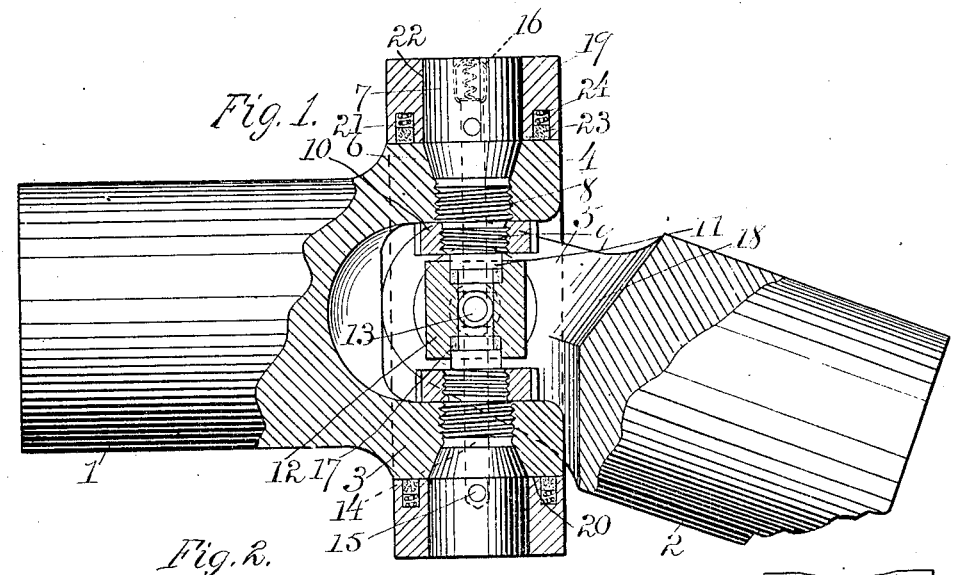
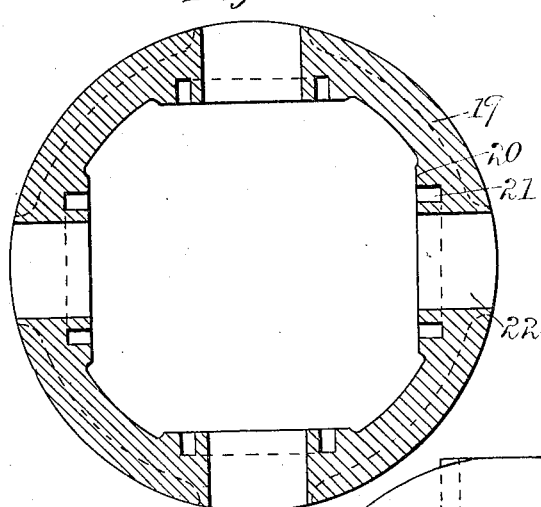
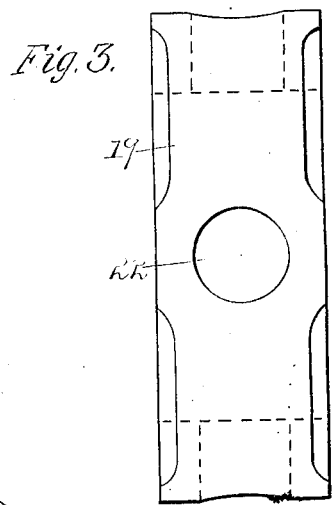
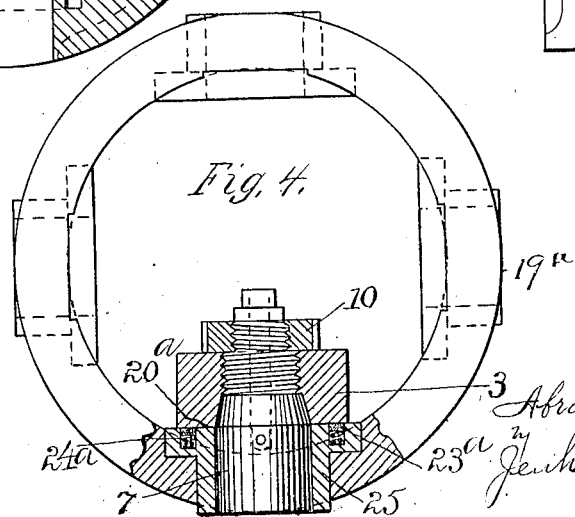
Witnesses:
Inventor
Abraham Vanderbeek

UNITED STATES PATENT OFFICE.

ABRAHAM VANDERBEEK, OF HARTFORD, CONNECTICUT.

UNIVERSAL JOINT.

No. 851,845.  Specification of Letters Patent.  Patented April 30, 1907.

Application filed August 11, 1905. Serial No. 273,723.

*To all whom it may concern:*

Be it known that I, ABRAHAM VANDERBEEK, a citizen of the United States, and a resident of Hartford, in the county of Hartford and State of Connecticut, have invented a certain new and Improved Universal Joint, of which the following is a specification.

My invention relates to the class of devices for transmitting power between two members located at an angle each to the other, and the object of my invention is to provide a device of this class, having an outside leverage as far as possible from the center, including a supporting member; a further object of the invention is to provide a device in which the parts may be readily separated for the purpose of renewal, or for any other purpose; a further object of the invention is to provide means for self lubrication of all parts of the structure in a thorough manner; and a further object is to provide a structure that shall be effectually protected from grit and dirt; and a still further object is to provide a device which shall occupy but little space as compared with the strength thereof and one which shall at the same time contain the greatest simplicity as to the construction of the parts.

One form of device in the use of which these objects may be attained is illustrated in the accompanying drawings, in which—

Figure 1 is a view in side elevation of a structure embodying my invention with parts broken away in central section to show construction. Fig. 2 is a sectional view of the binding ring. Fig. 3 is an edge view of the same. Fig. 4 is a detail view partly in section of the binding ring showing a modified form of the invention.

While devices for transmitting power between two members located at an angle each to the other have long been employed, the rapid advance which is being made in mechanical construction in certain lines has greatly enlarged the field for devices of this class. In the field now occupied by such devices the requirements are very exacting and necessitate a universal joint or connection so constructed as to successfully resist excessive strains, and at the same time reduce to a minimum the friction caused by the relative movement of the parts; the requirements also necessitate a joint or connection that shall require little attention, and that shall be thoroughly protected from exposure to grit, dust and moisture. A device constructed to embody such features is illustrated in the accompanying drawings and embraces as essential parts bifurcated or forked stems 1 and 2 which may be provided with any suitable means for connection with the driving and driven parts; a bearing and binding member 19 surrounding the bifurcated stems; removable studs 7 borne by the forks; a central supporting part 12 for supporting the inner ends of the studs, this central member also acting as a receiver and distributer for lubricant; and protective washers for closing the bearings against the entrance of dust, dirt or moisture.

The forks 3–4 and 5 shown in the drawings, one of the forks being broken away from the stem 2, have openings formed therein for the reception of the pins 7. These openings are beveled as at 6 to receive the tapered surface on the pins 7. Each of the pins is threaded as at 8 to fit a threaded surface in the forked member, and on a reduced part a thread 9 of different form is provided which engages with the thread of a lock nut 10. Each of the pins is further reduced as at 11 to engage an opening in the block 12, which forms a central supporting member. The openings for the reception of the pins 7 in this block 12 extend through from side to side, these openings of course communicating with each other at the center of the block and forming an oil reservoir 13. Each of the pins 7 is provided with an oil passage 14 communicating with an opening 15 extending radially therefrom to the surface of the pin. In one of the pins this oil passage 14 extends to the outer end of the pin, said passage terminating short of the end of the pin in each of the other instances. This passage is provided with a cap or cover 16, and the passage extends to the end of the pin for the purpose of providing means for supplying oil to the oil reservoir.

The openings for the pins 6 in the block 12 are made of sufficient depth to allow for the insertion of a packing 17 located between a shoulder on the pin and the bottom of the pin socket to prevent oil from leaking out at these points, and to prevent the entrance of dirt and grit.

Each of the stems between the forks is tapered and rounded as at 18, the round surfaces being provided to conform to the outer end of the opposite fork, and the tapered surface providing for a swinging movement of the shanks to any desired angle with respect to the axis of the opposite shank.

A ring surrounding member 19 extends around the structure and is secured to each of the fork members which are flattened on their outer sides to fit the flattened surfaces 20 on the ring. This ring constituting a bearing and binding member is made of a single piece and thus provides the greatest amount of strength as compared with the size of the ring. An annular groove 21 is formed about each of the openings 22 in this ring, at the outside edge of the bearing contacts, for the reception of a packing 23 which may be forced outward as by a spring 24 against the face of the fork members. It will be noted that the mouths of the openings 15 are located within the boundary of this ring to provide a proper lubricant therefor, and the packing rings or washers 23 prevent the entrance of dust to the bearing surfaces between the ring and pins or between the fork members and pins.

In Fig. 4 of the drawings I have shown a modification of the invention. In this form of the device the ring 19ª is provided with a flange or bushing 25 one end of which forms the flattened surface or bearing 20ª for the reception of the outer surface of the forks 3. The pins 7 are of the same construction as hereinbefore described, (one, however, only being shown) and are fitted with the lock nuts 10. In this form of device the ring is formed with less difficulty and the construction is therefore desirable in some instances. This structure is provided with a packing ring 23ª and springs 24ª as in the structure hereinbefore described.

By the construction herein shown the pins 7 may be hardened with little difficulty and they provide a removable stud for the reception of the ring which may be easily renewed at any time. The ring may be also hardened with little difficulty and thus provide hardened surfaces to resist wear between the pins and the ring at which point it is obvious the greatest wear will occur.

While there has been shown in the drawings herein a dust washer of special construction, it will be obvious that the device described and claimed herein is usable with any form of dust washer without regard to its specific construction.

What I claim as my invention and desire to secure by Letters Patent is:—

1. A pair of bifurcated stems the forks of which have openings with beveled seats, means for pivotally uniting the stems and including pins having beveled surfaces to fit said beveled seats, and means for drawing said pins to said beveled seats and to secure them against turning movement within the stems.

2. A pair of bifurcated stems, pins removably secured to said stems and located in the same plane, and means including a binding member bearing directly upon said pins and surrounding the bifurcated ends of the stems for pivotally uniting them.

3. A pair of bifurcated stems, pins removably secured to said bifurcated ends and located in the same plane, and a solid binding member surrounding the bifurcated ends and pivoted directly on said pins.

4. A pair of bifurcated stems, pins removably secured to each of the branches of said stems, a supporting member borne on the inner ends of said pins, and a solid binding member surrounding said bifurcated ends and pivoted on said pins.

5. In a universal joint, in combination, a pair of shanks each provided with fork members, pins removably secured in the same plane in the branches of said fork members and projecting beyond the outer surfaces thereof, and a ring surrounding said branches and pivoted directly upon said pins.

6. In a universal joint, in combination, a pair of members united to swing in transverse planes, pins removably secured in the same plane to said members and included in the pivotal connecting means, and a ring formed of a single piece extending about the members and bearing directly upon said pins.

7. In a universal joint, in combination, two members united to swing in transverse planes, a block having an oil chamber and forming a portion of the pivotal connecting means, pins projecting from said members into the block and each having an oil passage communicating with the oil chamber and terminating at the bearing surface of the pin.

8. In a universal joint, in combination, a pair of shanks each provided with fork members, pins secured in the fork members and forming a part of the pivot connection and having oil passages extending from the inner ends of the pins to the bearing surfaces at the sides, a block pivotally united to the pins and having an oil chamber communicating with the oil passages therein, and a ring extending about the fork members and pivotally united to said pins.

9. In a universal joint, in combination, a pair of shanks each provided with fork members, a block forming a part of the pivotal connection between said members and having an oil chamber, pins extending from the fork members into said block and having oil passages extending lengthwise along the pins and out to the bearing surface at the side thereof, one of said pins having an oil passage extending from end to end thereof, an oil cap for the mouth of said opening, and a ring extending about the fork members and pivotally united to the pins.

10. In a universal joint, in combination, a pair of shanks each provided with fork members, pins projecting inward from the fork members and having threaded surfaces, nuts located on said threaded surfaces at the inner sides of the fork members, and a block pivoted on the ends of said pins beyond the nuts.

11. In a universal joint, in combination, a pair of shanks each provided with fork members, pins projecting inward from the fork members and having threaded surfaces and oil passages extending from the inner end to the bearing surfaces of the pins, lock nuts located inside of the forks on the threaded surfaces of the pins, and a block forming a part of said pivotal connection and having an oil chamber communicating with the oil passages in the pins.

12. In a universal joint, in combination, a pair of shanks each provided with fork members, pins united to the fork members by interengaging screw threads and having on the projecting ends screw threads of different form, said pins having oil passages extending from the inner ends to the bearing surfaces on the sides, a lock nut secured to each pin inside of the forks, a block pivotally united to the inner ends of the pins and having an oil chamber communicating with the oil passages therein, and a ring surrounding the fork members and pivotally united to said pins.

13. In a universal joint, in combination, a pair of shanks each provided with fork members that have threaded openings with beveled surfaces, pins projecting from the fork members and having threaded and beveled surfaces fitting the threaded and beveled surfaces of said openings and having oil passages from the inner ends to the bearing surfaces, a block pivotally united to said pins and having an oil chamber communicating with the oil passages in the pins, and a ring surrounding the fork members and pivotally mounted on said pins.

14. In a universal joint, in combination, a pair of shanks each provided with fork members, means for pivotally uniting the fork members and including pins projecting from the outer surfaces thereof, and a ring pivotally mounted on said pins and surrounding the fork members, and a dust cap located between the bearing surfaces of the fork members and said ring.

15. In a universal joint, in combination, a pair of members pivotally united to swing in transverse planes, a block having an oil chamber and forming a part of said pivotal connection, a pivot pin projecting into said block and forming part of the pivotal connection, and an oil retaining washer for the chamber in said block, said washer being located to prevent escape of oil from said chamber around said pin.

16. In a universal joint, in combination with two parts to be pivotally united, pins projecting from the parts and forming a part of said pivotal connection and having oil passages extending to the bearing surfaces of the pins, a block having an oil chamber communicating with said passages and pivotally united to said pins, and a packing for the joint between said block and the ends of the pins.

17. In a universal joint, in combination, a pair of shanks each provided with fork members, hardened pins projecting from the fork members and removably secured thereto, and a ring extending about the fork members and pivoted directly upon said pins.

18. A pair of bifurcated stems, pins removably secured to the branches of said stems and projecting on opposite sides thereof, means for securing the pins, a ring surrounding the forks and pivoted on said pins, and a block pivoted on the inner ends of said pins between the forks.

19. In a universal joint, in combination, a pair of shanks each provided with fork members and an opening forming a beveled seat for a pin, pins projecting inward from the fork members and having threaded surfaces, and also beveled surfaces fitting the seats in the fork members, nuts located on said threaded surfaces at the inner sides of the fork members, and a block pivoted on the ends of said pins beyond the nuts.

20. A pair of bifurcated stems including a fork having an opening with a beveled seat, means for pivotally uniting the stems and including a pin having a beveled surface to fit said beveled seat, and means for drawing said pin to said beveled seat and to secure it against turning movement within the stem.

ABRAHAM VANDERBEEK.

Witnesses:
A. I. JACOBS,
ARTHUR B. JENKINS.